US006762907B2

(12) United States Patent
Patel et al.

(10) Patent No.: US 6,762,907 B2
(45) Date of Patent: Jul. 13, 2004

(54) DISC DRIVE HAVING INTEGRAL BASE COOLING

(75) Inventors: Chandrakant D. Patel, Fremont, CA (US); Jean-Francois Dreux, Saint-Martin-D'Heres (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 380 days.

(21) Appl. No.: 09/876,566

(22) Filed: Jun. 7, 2001

(65) Prior Publication Data

US 2002/0186500 A1 Dec. 12, 2002

(51) Int. Cl.[7] ............................................. G11B 33/14
(52) U.S. Cl. .................................................. 360/97.02
(58) Field of Search .......................... 360/97.02, 97.01; 361/685, 687, 689, 700, 719

(56) References Cited

U.S. PATENT DOCUMENTS

| | | | | |
|---|---|---|---|---|
| 4,414,604 | A | * | 11/1983 | Matsui et al. ............... 361/698 |
| 6,289,678 | B1 | * | 9/2001 | Pandolfi ........................ 62/3.2 |
| 6,308,524 | B1 | * | 10/2001 | Mochizuki et al. ......... 62/259.2 |
| 6,360,813 | B1 | * | 3/2002 | Katoh et al. ............ 165/104.33 |
| 6,434,000 | B1 | * | 8/2002 | Pandolfi ..................... 361/685 |
| 6,519,149 | B1 | * | 2/2003 | Inoue .......................... 361/689 |
| 6,528,909 | B1 | * | 3/2003 | Kan et al. ...................... 310/52 |
| 6,549,414 | B1 | * | 4/2003 | Tokuhara et al. ........... 361/719 |
| 6,550,531 | B1 | * | 4/2003 | Searls et al. ............ 165/104.33 |
| 6,567,269 | B2 | * | 5/2003 | Homer et al. ............... 361/700 |
| 6,621,698 | B2 | * | 9/2003 | Chang ......................... 361/687 |

FOREIGN PATENT DOCUMENTS

| | | | |
|---|---|---|---|
| JP | 58003166 | * | 1/1983 |
| JP | 61233488 | * | 10/1986 |
| JP | 61269285 | * | 11/1986 |
| JP | 04254983 | * | 9/1992 |
| JP | 05151642 | * | 6/1993 |
| JP | 06044768 | * | 2/1994 |
| JP | 11330757 | * | 11/1999 |

\* cited by examiner

Primary Examiner—A. J. Heinz
Assistant Examiner—Angel Castro

(57) ABSTRACT

A disc drive system having a rotating disc storage device and a base housing with a sealed internal heat transport structure containing a working fluid. The rotating disc storage device is disposed on the base housing and has at least one heat-generating component in a heat exchange relationship with the base housing. The heat transport structure is formed as a cavity or at least one fluid passage arranged radially, in parallel, as a matrix, or a serpentine channel. Absorbed heat vaporizes the working fluid. The vapor transports the heat from a heat transport structure evaporator section near a relatively hot location of the base housing, to a heat transport structure condenser section near a relatively cooler location of the base housing, where the vapor condenses to liquid and releases the heat. The liquid working fluid is drawn by capillary action from the condenser section back to the evaporator section, aided by a wicking structure. The heat transport structure is formed in the base housing by drilling, casting, machining or embedding heat pipes.

17 Claims, 7 Drawing Sheets

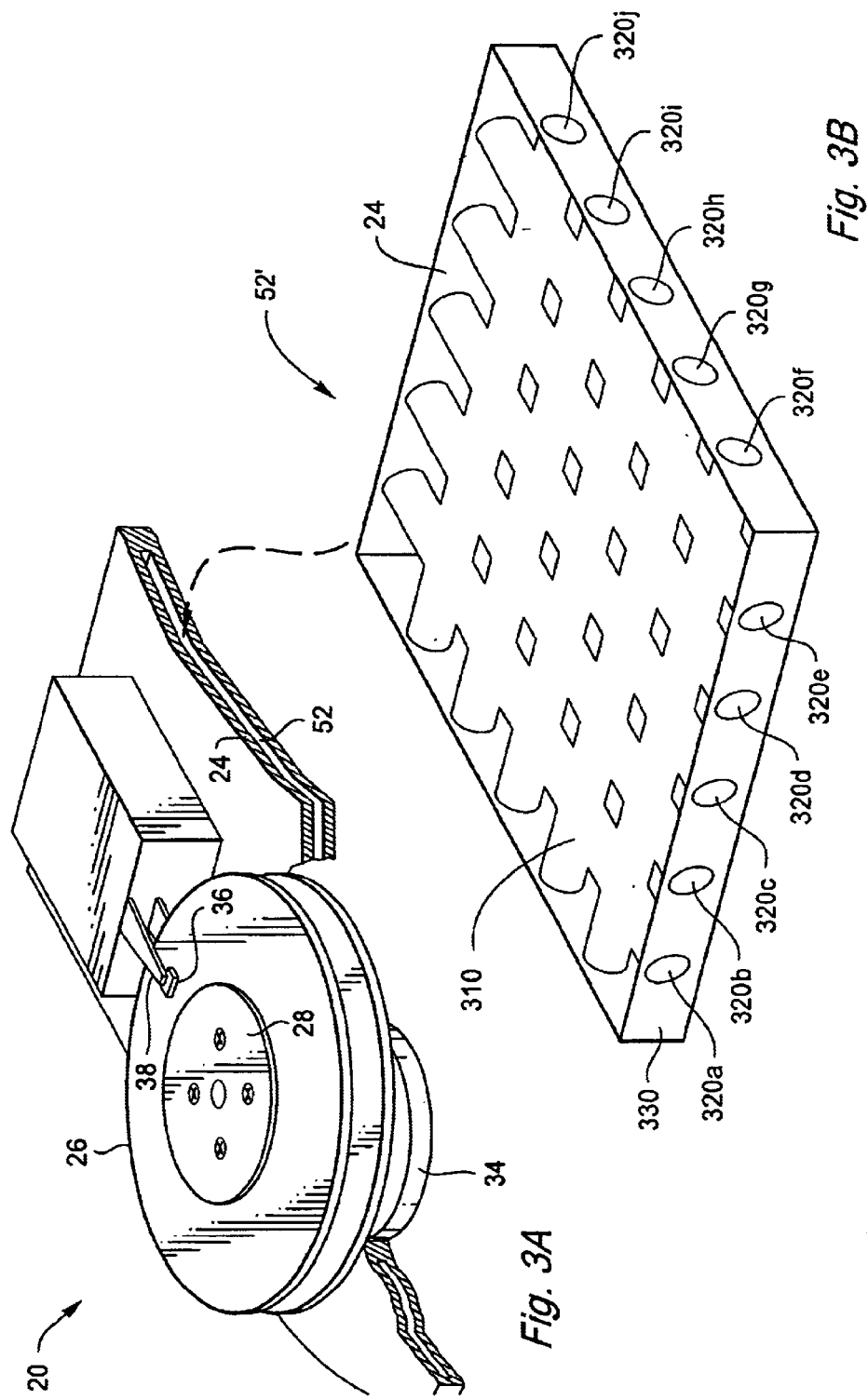

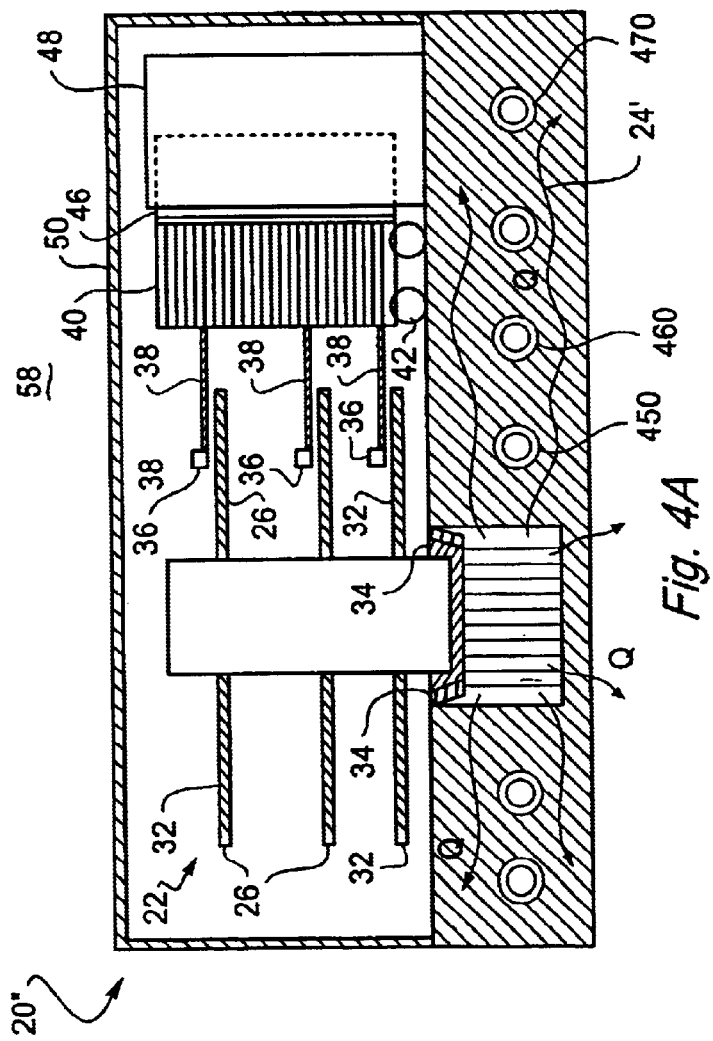
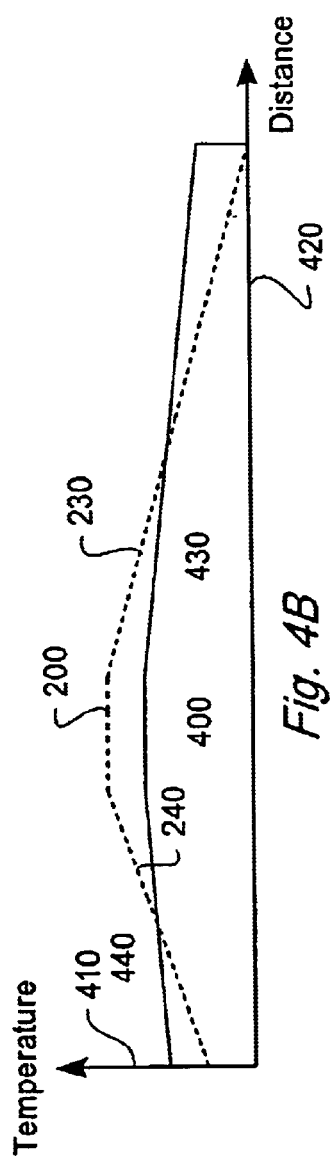
Fig. 4A
Fig. 4B

DISC DRIVE HAVING INTEGRAL BASE COOLING

FIELD OF THE INVENTION

The present invention generally relates to disc drive systems and, more particularly, to apparatus and techniques for cooling disc drive systems.

BACKGROUND OF THE INVENTION

Disc drive systems are configured as stand-alone devices, with plug-in communications to computer systems, or as integral sub-systems within a computer system, such as in a personal computer or server. As disc drive systems become faster and more powerful, they consume increasingly greater quantities of power. This power is dissipated primarily as operating heat. As a result, the amount of internally-generated operating heat has correspondingly increased to the extent that an adequate heat removal strategy has become a major design concern in these more powerful disc drive devices. With the advent of high RPM drives, such as 10K RAM drives, and high mass storage requirements, cooling requirements for disc drive systems has surpassed the capacity of known thermal conduction techniques.

In a conventional disc drive system, discs of recording media are fitted onto a spindle. The discs and spindle rotate by a motor at high speed on bearings disposed within a base housing. The friction generated between the spindle bearing and the base housing is a principal source of heat generated during disc drive system operation. The spindle motor, also typically disposed in the base housing, is another significant heat source. Excess heat can damage disc drive components thereby shortening their lives. Inadequate heat conduction by the mass of the base housing, away from the heat-generating components (e.g., spindle motor and bearing), can result in isolated "hot spots" and undesirably high component temperature adversely affecting the disc drive system's operation, reliability and longevity.

Typically, operating heat from the spindle bearing and motor are conducted through the mass of the base housing and dissipated to ambient. The quantity of heat conducted away from the heat-generating components is a function of the temperature differential between the heat-generating components and the base housing, the thermal conductivity of the base housing mass from near the heat-generating components to the base housing surface exposed to ambient, and the temperature differential between the base housing surface and ambient.

Common conventional approaches for improving disc drive cooling are directed at increasing the quantity of heat transferred from the base housing surfaces to ambient by improving the temperature differential between the base housing surface and ambient. In particular, one favored approach uses mechanical means (e.g., fans) to force air flow past the base housing to replace hot air with cooler air, thereby reducing ambient air temperature near the base housing surface and increasing the temperature differential. Other conventional approaches are directed at increasing the base housing heat-dissipating surface area (e.g., adding finned heat sink configurations). Conventional cooling approaches, such as fans and heat sinks, add volume to the disc drive system package and increase costs. Mechanical cooling means require additional energy, generate additional heat (which must also be dissipated), and make noise. Mechanical fans are also subject to failure.

It will be appreciated that there is a need for a maintenance-free system and method for effectively cooling disc drive components without adding volume, additional heat, or significant cost. A disc drive system and method that address the aforementioned problems, as well as other related problems, are therefore desirable.

SUMMARY OF THE INVENTION

According to one aspect of the present invention, there is provided a disc drive system and a method for removing heat away from near disc drive components by using an internal working fluid to more efficiently transport the heat. The disc drive system includes a rotating disc storage device having at least one heat-generating component, and a base housing internally having a sealed heat transport structure containing a working fluid. The rotating disc storage device is disposed on the base housing. The heat-generating component(s) of the disc storage device are in a heat exchange relationship with the base housing.

The sealed heat transport structure is adapted to receive heat from a first portion of the base housing, fluidly transport the heat to a second portion of the base housing, and release the heat to the second portion of the base housing. The working fluid absorbs heat from near the first portion of the base housing. Working fluid in a gas phase transports the heat, by thermal expansion, to near the second portion of the base housing where the working fluid condenses into a liquid form and releases the heat. The liquid form of the working fluid flows by gravity and/or is drawn by capillary action back near the first portion of the base housing in a continuous cycle. The heat transport structure is optionally inclined to assist gravity flow of liquid working fluid and internally adapted to have a wicking surface, or contain a wicking structure, to facilitate the capillary action.

According to another aspect of the present invention, there is provided a method for making a disc drive of the present invention. The heat transport structure is formed by drilling, casting or embedding fluid passages in the base housing, partially filling the fluid passages with the working fluid, and sealing the fluid passages to retain the working fluid. Prior to sealing, the fluid passages are optionally evacuated to reduce internal pressure, thereby lowering the boiling point of the working fluid contained therein.

BRIEF DESCRIPTION OF THE DRAWINGS

The invention may be more completely understood in consideration of the following detailed description of various embodiments of the invention in connection with the accompanying drawings, in which:

FIG. 3A is a perspective view of one example embodiment of a disc drive system having a base housing with an internal heat transport structure (cavity) in accordance with the present invention;

FIG. 3B is a perspective view of one example embodiment of a heat transport structure formed by cross-drilling fluid passages in a base housing in accordance with the present invention;

FIG. 4A is a side cross-sectional view of one example embodiment of a disc drive system having a heat transport structure formed by embedding heat pipes in a base housing in accordance with the present invention;

FIG. 4B is a temperature gradient diagram for the disc drive system of FIG. 4A in accordance with the present invention;

Figure 1:
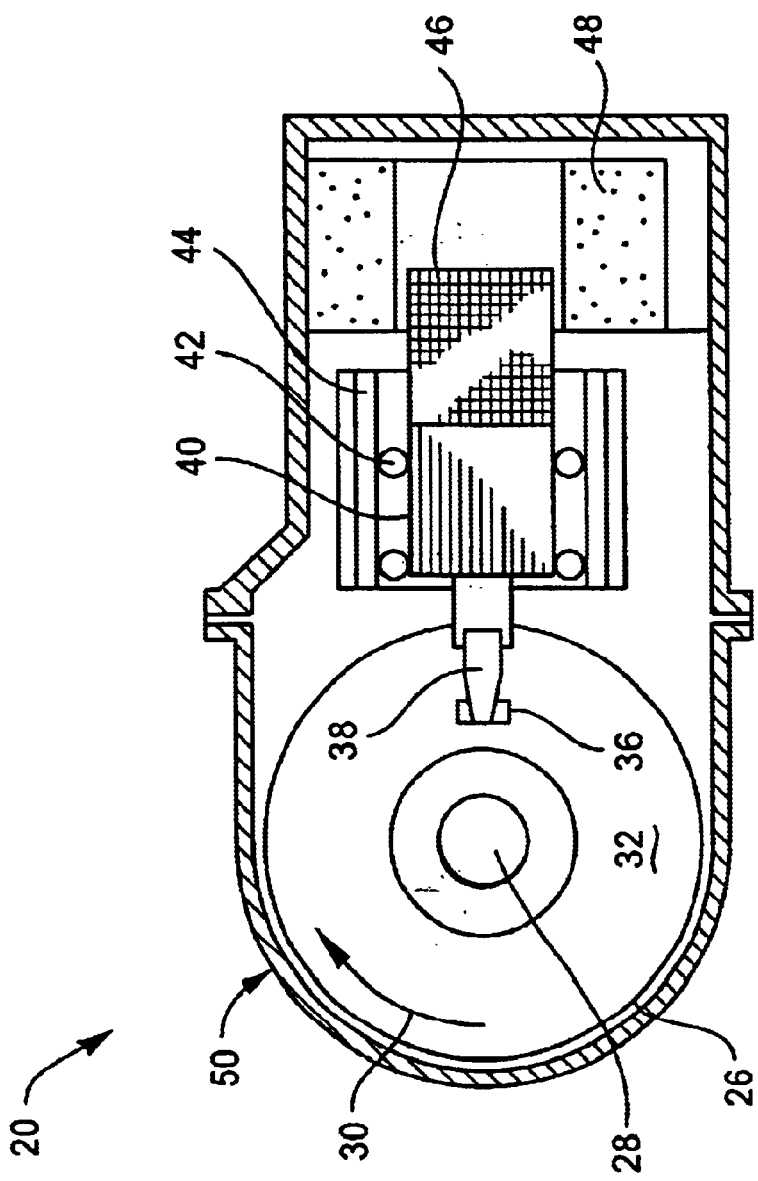
FIG. 1 is a top view of one example embodiment of a disc drive system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

A disc drive system having a rotating disc storage device and a base housing with an integral, internal heat transport structure containing a working fluid is provided. Components of the disc drive system generate heat. The base housing is formed of metallic material (e.g., aluminum, copper, magnesium, or alloys thereof), ceramics, or plastics for mechanically supporting the rotating disc storage device. The heat transport structure is configured as a cavity, or an arrangement of one or more fluid passages. The fluid passages are further configured as a serpentine channel, radial channels, parallel channels in a single orientation, or a matrix of intersecting channels. Methods of creating the fluid passages in the base housing include drilling, casting, machining or forming. Alternatively, sealed heat pipes containing the working fluid are embedded in the base housing, or the base housing is formed around the heat transport structure. The heat pipes are mechanically expanded into thermal contact with the base housing. Optionally, a thermal compound is located between the heat pipes and the base housing to improve heat conduction.

The fluid passages have an evaporator section and a condenser section separated by an adiabatic section. The evaporator section of the heat transport structure is located near a relatively hot location of the base housing and the condenser section is located near a relatively cooler location of the base housing. The fluid passages are evacuated in pressure to lower the boiling point of the working fluid contained therein. A seal confines the working fluid within the heat transport structure. The cavity or arrangement of fluid passages are optionally adapted for gravity to assist return flow of the working fluid from the condenser section to the evaporator section, for example, by orienting the fluid passages at an incline relative to the resting position of the base housing. The evaporator section functions as a sump for the liquid working fluid.

Heat from the rotating disc storage device is received in the evaporator section of the heat transport structure via a relatively hot location of the base housing and is absorbed by the liquid working fluid. At least a portion of the working fluid is vaporized and the heat is transferred by the working fluid in a gas phase through the adiabatic section to the condenser section. By condensing to a liquid phase, the gaseous working fluid releases the transported heat back to a relatively cooler location of the base housing. The liquid phase working fluid is drawn by capillary action, gravity, or both, from the condenser section back to the evaporator section. A wick is included in the heat transport structure to facilitate the capillary action.

Referring to FIG. 1, a disc drive system is generally indicated at 20. Disc drive system includes a rotating disc storage device 22 mounted upon a base housing 24. Rotating disc storage device 22 comprises a plurality of discs 26 fitted onto a spindle 28 for rotation at high speed about spindle 28 in the direction indicated by arrow 30. Discs 26 are formed of magnetic media, or alternatively, optical media. Discs 26 have at least one surface 32 adapted for data storage. Spindle 28 is rotationally supported by spindle bearing 34 disposed within base housing 24. Spindle 28 is rotatably coupled to a disc drive motor 60, also disposed within base housing 24. A plurality of read/write heads 36 are attached to and supported by a read/write head support structure 38. Read/write head support structure 38 is adapted to support read/write heads 36 for movement in a face-to-face relationship with disc surfaces 32. A read/write head drive mechanism 40 is adapted to move read/write head support structure 38 in a predetermined direction. Read/write head support structure 38 movement is guided by ball bearings 42 and guide rails 44 to restrict movement of each of read/write head 36 to radial movement over the corresponding disc surface 32. Read/write head drive mechanism 40 consists essentially of an electric coil 46 and a permanent magnet 48. Rotating disc storage device 22 is enclosed in a rotating disc storage device housing 50.

Figure 2A:
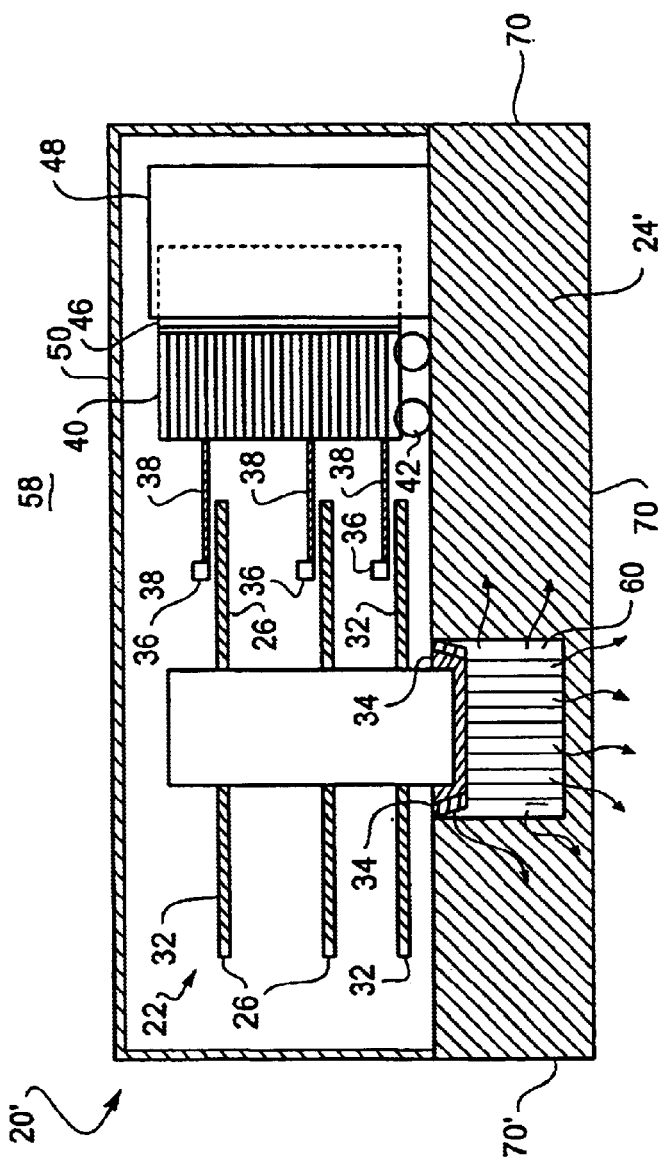
FIG. 2A is a side cross-sectional view of one example embodiment of a disc drive system having a conventional solid base housing.

FIG. 2A illustrates a cross-sectional view of one example embodiment of a disc drive system having a solid base housing as is conventionally known. Operatively disposed in a heat exchange relationship within base housing 24', are a variety of heat-generating components including spindle bearing 34 and motor 60. Spindle bearing 34 friction and motor 60 electrical resistance are principle sources of heat, Q, generated by disc drive system 20'. Heat generated by heat-generating components is absorbed by base housing 24' at hot locations (adjacent heat-generating components) and conducted three-dimensionally through base housing 24' to base housing exterior surfaces 70, where the heat is dissipated to ambient. Heat flow is diagrammatically represented in FIG. 2A as Q. Heat generated by rotating disc storage device 22 raises the temperature of base housing 24, establishing a thermal gradient. Motor 60 typically dissipates approximately 15 watts of energy, for example, and raises base housing 24 temperature approximately 3° C. per watt, or 45° C. total above ambient temperature.

Although only shown in two dimensions in FIG. 2A, heat flows through base housing 24' in three dimensions away from the heat-generating component. The mass of base housing 24' serves as a heat sink for heat generated by heat-generating components disposed within base housing. Base housing 24' is typically constructed of material having high thermal conductivity properties, such as metallic material including aluminum, steel, copper, or magnesium, but may be formed of other materials, including non-metallic materials and plastics.

Figure 2B:
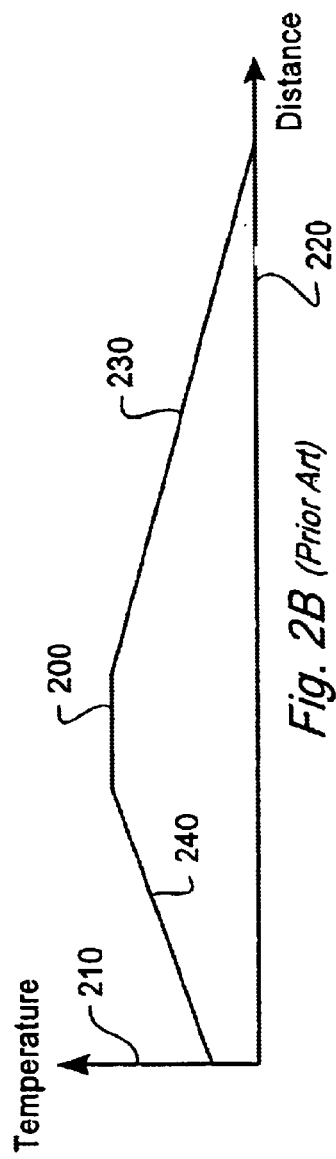
FIG. 2B is a temperature gradient diagram for the disc drive system having a conventional solid base of FIG. 2A.

FIG. 2B is a temperature gradient diagram for disc drive system 20' of FIG. 2A, having a solid base housing. A vertical axis 210 is representative of temperature. A horizontal axis 220 is representative of distance along base housing 24'. Horizontal axis 220 is proportional to and in alignment with the span of disc drive system 20'. As is illustrated at plateau 200, temperature is greatest in the vicinity of heat-generating components, and declines by some gradient at a distance away from the heat-generating components. A temperature gradient 230 to the right of the heat-generating components and a temperature gradient 240 to the left of the heat-generating components are shown to be approximately equal based on similar thermal conductivity properties of the base housing material in each direction. The left base housing exterior surface 70' is nearest the heat-generating components; therefore, the surface temperature at the right base housing exterior surface 70 is cooler than the surface temperature at the left base housing exterior surface 70'. It follows that the rate (and thus, amount) of heat dissipated to ambient from the right base housing exterior surface 70 will be less than the rate of heat dissipation to ambient from the left base housing exterior surface 70'.

"Hot spot" temperatures occur in the vicinity of disc drive heat-generating components such as spindle bearing 34 and motor 60 for example, and at junctions between heat-generating components and base housing 24', creating hot locations within base housing 24'. Improving heat conduction through base housing 24' away from hot locations reduces disc drive component "hot spot" temperatures significantly. Accordingly, a key feature of the present invention is to improve thermal conductivity of the base housing (e.g., approximately 6x) by providing more efficient heat transport means within the base housing. Transporting heat more rapidly through the base housing to its surfaces raises base housing surface temperature, and increases the temperature differential between base housing surface and ambient. Increasing the temperature differential between base housing surfaces and ambient therefore increases the rate of heat dissipation from base housing to ambient, and thus improves cooling of the disc drive system.

FIG. 3A illustrates one example embodiment of the present invention. Elements illustrated with like numbers indicate like elements throughout the figures. A heat transport structure 52 is provided internal to base housing 24. FIG. 3A shows a heat transport structure 52 in the form of a cavity integral to base housing 24. The cavity provides a path by which a working fluid may be disbursed to various locations of base housing 24. The cavity is in the shape of a square. Other embodiments of the present invention include rectangular, multi-angular, non-angular, regular or irregular two-dimensional cavity shapes. The particular cavity shape is dictated by the locations of disc drive system heat-producing components. A common feature of a square shaped cavity, or any other shaped cavity as described herein, is that at any particular point the cavity provides a two-dimensional path for the flow of the working fluid in its vapor and liquid form.

Base housing 24 is preferably constructed of magnesium or of one of its alloys although aluminum, steel, copper, metallic alloys, plastics, or other materials can be used within the spirit of the invention. Base housing 24 is fabricated by casting, molding, machining or forming. A Thixomolding process is a preferred method of molding magnesium. "Thixomolding" is a trademark of Thixotech, Inc., a corporation having its offices in Calgary, Alberta, Canada. Thixotech, Inc. is in the business of thixomolding. Base housing 24 has an external shape which is smooth, or alternatively has irregular features depending upon manufacturing and design preferences. At least a portion of base housing 24 is sufficiently thick as to accommodate heat transport structure 52 in the form of a cavity or at least one fluid passage. The heat transport structure is described in further detail below.

Cavity 52 is located under the surface of, and within, base housing 24. Cavity 52 is formed by molding or casting the cavity shape into base housing 24. Alternatively, base housing 24 is cast or molded as an integral piece of cast material, and the particular cavity shape is formed by machining the shape into the previously molded or cast base housing 24. Structural material surrounding cavity 52, which form side walls of cavity 52, and contain a working fluid, is likewise an integral part of base housing 24, and is comprised of homogeneous material. For example, if casting is the method of fabrication of base housing 24, then the structural material defining cavity 52 and forming the side walls of cavity 52, is cast as an integral part of the same piece to the base housing cast.

Cavity 52 (the heat transport structure) is generally flat in shape. Its length and width dimensions are much longer than the dimension of the depth of cavity 52. By "depth," the dimension of cavity 52, as measured in a vertical direction through base housing 24 (e.g., through the thin dimension of base housing 24), is meant. Cavity 52 need not occupy a large part of the area of base housing 24, the amount of area occupied being a thermal dissipation design decision within the ability of those skilled in the art. Any irregular cavity shape may be provided as well, for example, a triangular shape, rectangular shape, circular shape, channel, or matrix are all within the spirit of the invention. Such regular or irregular shapes are fabricated and provided with features in the same fashion as cavity 52 described herein.

A working fluid is contained within the cavity and a wicking structure, or wick, is optionally provided. In one embodiment, the cavity is partially filled with the working fluid. Liquid working fluid occupies in the range of three to five percent (3–5%) of the cavity's volume at ambient temperatures in one example embodiment. The volume of working fluid is not strictly limited in the present invention to the above-mentioned range. The volume of cavity occupied by liquid working fluid is dependent on the properties of the working fluid selected and the quantity of heat generated by the disc drive system. Other embodiments of the heat transport structure contain more or less liquid working fluid. A range of heat transport structure volume occupied liquid working fluid is possible within the spirit of the present invention. It is desirable to provide a sufficient quantity of liquid working fluid to support capillary action flow at expected maximum disc drive operating temperatures. Additionally, the volume of the heat transport structure not occupied by liquid working fluid must be adequate to permit sufficient quantities of gaseous working fluid to form and transport the expected quantities of heat. The amount of heat transport structure volume occupied by the working fluid being a thermal dissipation design decision within the ability of those skilled in the art. It is desirable to approximately maximize the quantity of heat transported at expected disc drive operating conditions, or alternatively, at expected maximum disc drive operating temperatures.

Various surface topographies are known to facilitate capillary action by serving as a wicking structure, therefore internal surfaces of cavity 52 need not be smoothed if the roughness facilitates capillary action. In one embodiment of cavity 52, a wick is disposed within cavity 52 in a planar fashion, the plane of the wick being parallel to the plane of cavity 52. In another embodiment, a wick is disposed around a cavity support, or integrated into the structure of the cavity support.

Preferential location of cavity 52 within base housing 24 is used with the invention, a preferred cavity location being one that improves heat transport efficiency. Cavity 52 is optionally formed to provide gravity-assisted flow of condensed (i.e., liquid) working fluid to one or more particular locations within cavity 52. Cavity 52 is sealed by a seal 580. The depth of cavity 52 can be chosen by those skilled in the art to provide heat transfer across the depth since liquid working fluid will typically collect on the bottom of cavity 52. A cavity vertical dimension (i.e., depth) of 1 to 3 millimeters may be appropriate but would depend upon factors familiar to those skilled in the art. The volume of cavity 52 may be evacuated or not, and occupied by a working fluid in liquid and vapor form, and optionally by a wicking structure. For the embodiments described herein, heat transport structure 52 is referred to as a cavity, however heat transport structure 52 is just as well referred to as a "vessel," "fluid passage," "channel," or "matrix," as all are equally suitable nomenclature.

In one example embodiment, cavity 52 has internal supports to provide mechanical support for base housing 24 and rotating disc drive system 22. Supports to provide mechanical support to seal 580, in order to prevent deformation of seal 580 in the event of mechanical pressure to the outside of seal 580, are included in another example embodiment. Supports are located and sized so as not to inhibit a conductive path for heat flow within cavity 52.

FIG. 3B illustrates another example embodiment of a heat transport structure 52' of the present invention. Disc drive system 20 is illustrated with like numbers indicating like elements as are illustrated in previous figures. Alternative to being a single cavity within base housing 24, heat transport structure 52' comprising a matrix 310 is formed, for example, by cross-drilling intersecting fluid passages 320a–j through base housing 24 material. FIG. 3B illustrates an internal portion 330 of base housing 24 that alternatively occupies the volume of cavity 52 of FIG. 3A. The internal portion 330 of base housing 24 includes an arrangement of drilled passages 320a–j, formed therein, comprising heat transport structure 52'.

Heat transport structure 52' is configured as a matrix of fluid passages 310 which are integral to base housing 24. Fluid passages 320a–e extend from one side of base housing 24 to an opposite side of base housing 24. Fluid passages 320f–j extend through base housing 24 substantially perpendicular to fluid passages 320a–e. The working fluid within fluid passage matrix 310 flows from any fluid passage to any other fluid passage comprising matrix 310. Fluid passages 320a–j only need to pass through one exterior surface 370 of base housing 24 if formed by drilling, so that sealing is only necessary on one end of each fluid passage 320a–j. If formed by casting, or the like, fluid passages 320a–j are formed without each and every fluid passage passing through an external surface of base housing 24. For example, only one fluid passage need extend through a base housing exterior surface to provide access to matrix 310.

The locations of fluid passages 320a–j are representative of one embodiment of the present invention, in that other embodiments include fluid passage locations chosen to be in any location within base housing 24. Selection of fluid passage preferential location is done to provide a heat dissipation means for certain heat producing disc drive components. In other words, preferential location of fluid passages provide certain locations of base housing 24 having enhanced heat dissipating capability.

Fluid passages are located to provide a heat communication path between hot and relatively cooler locations within base housing, or alternatively to a heat sink. Fluid passages are optionally oriented to provide gravity-assisted flow of condensed working fluid to certain desired locations of matrix 310. A fluid passage matrix 310 having approximately equally-space fluid passages, such as illustrated in FIG. 3B, provide an approximately equal dissipation of heat throughout base housing 24. Other embodiments of a fluid passage matrix, having fluid passages located, or concentrated, in a particular portion of base housing 24, provide more localized heat dissipation to selected portions of base housing 24.

In the illustrated embodiment of fluid passage matrix 310, each of fluid passages 320a–j is intersected by five other fluid passages. Thus for example fluid passages 320a–e are each intersected by fluid passages 320f–j. The intersections provide a path by which a working fluid moves from one fluid passage to another and this movement occurs by either, or both, the liquid or vapor phase of the working fluid. Additional embodiments of the present invention include various fluid passages added to, or removed from, fluid passage matrix 310, as a particular configuration demands. A fluid passage matrix is defined as consisting of two or more intersecting fluid passages wherein a fluid communication path is provided from any fluid passage within the matrix to all other fluid passages within the matrix. A further example embodiment provides more than one fluid passage matrix (i.e., a plurality of matrices) within the same base housing.

Fluid passage intersections are configurable in the form of an "L" shape, a "T" shape, or a "+" shape. An intersection is a fluid communication path between two fluid passages, and there is no requirement for a fluid passage to extend through and beyond an intersected fluid passage. Although fluid passages 320a–j are illustrated as parallel to a side of base housing 24, fluid passages are optionally provided with other orientations. Similarly in additional embodiments, fluid passages are chosen in various numbers and located in various locations according to the location of disc drive system heat-generating components and heat dissipation behavior desired for base housing. Intersections between fluid passages provide a fluid communication path from one fluid passage to another to provide a heat transportation path from one fluid passage to another. Heat transportation occurs while the working fluid is in liquid phase, vapor phase, or in transition between phases. Heat is absorbed by the working fluid by increasing its liquid or vapor temperature, and by vaporizing liquid working fluid (phase change).

As is the case of a heat transport structure in the form of a cavity, a fluid passage matrix provides a two-dimensional path for working fluid flow. Base housing 24 having heat transport structure 52' in the form of fluid passage matrix 310 is fabricated and sealed in the same fashion, and with any or all of the features or materials, of base housing and fluid passages of other embodiments described herein. For example, a wicking structure is provided within any or all of matrix 310 fluid passages in one example embodiment of the present invention. The working fluid is contained within all of the fluid passages of matrix 310, but the liquid form of the working fluid may principally collect in one or more designated fluid passages within the matrix.

In one example method of making heat transport structure 52', fluid passages are bored using a drill or other boring device. A diameter for fluid passages ranges up to fifty percent (50%) of base housing depth. For example, if base housing is 6 mm deep, fluid passage diameter is maximally 3 mm. Boring commences from one side surface of base housing 24, a fluid passage access, and continues to a desired length of a fluid passage. Care is taken such that the fluid passages are bored within the material of base housing 24 and do not penetrate the surfaces of base housing 24 other than at the fluid passage access. Fluid passages 320a–e are substantially parallel to one another, and substantially perpendicular to fluid passages 320f–j in the example embodiment illustrated in FIG. 3B.

In a further embodiment of the present invention (not shown), base housing 24 is formed in two, or more, parts (e.g., by casting), which are subsequently joined together. One, or more, base housing parts are chemically etched or otherwise processed to form therein an arrangement of various fluid passages. For example, one-half the diameter of each fluid passage is respectively formed into each half of a base housing cast in two portions. When mated together, the base housing portions form within the interior of base housing heat transport structure 52', a matrix 310 of intersecting fluid passages extending through the joining sections and communicating the interiors of the fluid passages. The two base housing halves are bonded together. In an alternate method, fluid passages are formed in only one base housing portion, which is subsequently covered by another base housing portion not having fluid passages formed therein (e.g., a cover). The base housing cover portion is bonded to the base housing portion having the fluid passages formed therein to complete the formation of the fluid passages. In another alternate method, base housing 24 is formed from sheet metal material, fluid passages are pressed or shaped into the sheet metal and joined together to form internal fluid passages. Fluid passages must be liquid and air-tight when sealed.

A seal is located at fluid passages access, particularly if fluid passages are formed by drilling or boring. The seal functions to retain the working fluid within the heat transport structure and to maintain an airtight seal or evacuation within the fluid passages. In one example embodiment, the seal is constructed as a plug that occupies part of fluid passage. Alternately, the seal is a cap that covers the fluid passage access from outside fluid passage access. The seal is constructed of magnesium, another metal or alloy, plastic, or epoxy, for example. Depending upon the material used to fabricate the seal, the seal is fastened to base housing by braising, gluing, mechanical friction or other means. A narrow hole, such is a "pinhole," is optionally provided as a feature of the seal allowing a subsequent evacuation of heat transport structure, followed by a "pinch-off" or by otherwise closing the narrow hole to complete the sealing process.

Each fluid passage has an evaporator section, an adiabatic section, and a condenser section. In one embodiment, the condenser section of the fluid passage is fabricated such that it is elevated with respect to the evaporator section. The fluid passages are oriented at an angle to the resting position of the base housing rather than horizontal to the resting position of the base housing. The elevated condenser position provides for gravitational forces to assist the return of the working fluid condensate to the evaporator section.

A wicking structure, or wick, is optionally provided within one or more fluid passages, preferably extending lengthwise along the fluid passage. The wick is either inserted into the fluid passage, is fabricate within, or is integral to the fluid passage. Example embodiments of wicks inserted into fluid passages include, but are not limited to, fiber bundles and mesh. Example embodiments of wicks fabricated within or integral to fluid passages include, but are not limited to, sintered wicks, grooved wicks, and rough surface wicks.

A sintered wick is fabricated by inserting a rod in a fluid passage, wherein the rod has a smaller diameter than the fluid passage such that a vacant space remains between the rod and a fluid passage wall. Powdered material is deposited into the fluid passage to fill up any vacant space. Then, heat is applied to the base housing, to the fluid passage, or to portions thereof, increasing the temperature of the powdered material sufficiently high as to cause sintering. After the rod and any remaining powdered material are removed, the sintered material remaining comprises the sintered wick. Alternatively, a wicking structure is fabricated by depositing, plating, diffusing, covering, or otherwise coating interior surface walls of the fluid passages with some material.

A grooved wick is fabricated by using a mechanical scribe to scribe grooves lengthwise along the length of a fluid passage. The mechanical scribe is attached to a scribe holder that is sufficiently small in diameter and sufficiently long as to allow entry of the scribe throughout the length of the fluid passage. Grooves are scribed individually, or alternatively, as a plurality of grooves. Since magnesium is a soft metal, this material is amenable to such a grooving process.

A rough surface wick is fabricated by using a mechanical roughening tool to create a roughened surface throughout the length of a fluid passage. The pores or crevices that are created by a sintered wick, grooved wick, or roughened wick facilitate capillary action flow of liquid working fluid from a condenser section to an evaporator section.

With a fluid passage and optionally a wick provided, a quantity of working fluid is deposited into the fluid passage. The fluid passage is then evacuated and a seal is made or attached to base housing such that the seal seals the fluid passage from the environment. The seal thereby maintains the evacuated state of the fluid passage, if such a state is chosen, while confining liquid and gas forms of the working fluid within the fluid passage. One method of accomplishing the foregoing is to deposit a working fluid into a fluid passage and fastened a seal to the fluid passage access but leaving a small opening between the seal and the fluid passage access for escape of gas. Then the fluid passage, or part of base housing nearest the fluid passage is heated such that gas, including some working fluid vapor, escapes from the fluid passage. The seal is then completed to fully seal the fluid passage such that when the fluid passage cools to ambient temperature, an evacuated state is provided within the fluid passage.

In one example embodiment of the present invention, a fluid passage contains working fluid which is a fluorocarbon liquid, such as Flourinert (FC-72) provided by the 3M (Minnesota Manufacturing and Mining) Corporation. Other working fluids including water, water-mixtures, acetone, alcohol, or a hydro-fluorinated-carbon refrigerant, such as R134A. Preferably, non-flammable working fluids are used. Considering that disc drive heat-generating components add sufficient heat to produce an approximate localized 45° C. temperature rise over ambient, a working fluid and heat transport structure internal pressure are selected in combination to provide a working fluid boiling point also at approximately 45° C. above ambient, or at the expected temperature rise above ambient, if different. One example embodiment of the present invention utilizes a working fluid selected to have a boiling point in the range of 65–70° C. at the internal pressure of the heat transport structure. In further embodiments, a mixture comprising working fluids individually having boiling points of 56° C., 70° C., and 80° C., result in a working fluid having a boiling point in the range of 56–80° C. In another embodiment, the working fluid is water having a boiling point of 100° C. at standard atmospheric pressure.

For fluorocarbon liquids, and other working fluids, having a boiling point at atmospheric pressure within a range of temperatures expected to be encountered when using the invention, it is not necessary to evacuate the fluid passages. Water is an example of a working fluid having a boiling point temperature, at atmospheric pressure, above the temperature expected when using the invention. Therefore, when necessary, the fluid passages are evacuated to a lower pressure in order to reduce the boiling point temperature of the working fluid, at the evacuated pressure, to within a range of temperatures expected when using the invention. In one example embodiment using water as the working fluid, the heat transport structure internal pressure is evacuated to a pressure at which water has a boiling point below 100° C. In a further example embodiment using water as the working fluid, the heat transport structure internal pressure is evacuated to a pressure at which water has a corresponding boiling point greater than or equal to 40° C., and also at which water has a corresponding boiling point less than or equal to 60° C.

Water is generally considered to be incompatible as a working fluid with magnesium and aluminum. Copper tubes or pipes are used to line fluid passages when water is used as the working fluid within fluid passages formed of incompatible materials, and optionally used whenever water is used as the working fluid. The copper tubes or pipes have an internal fluid passage to contain the working fluid. The internal fluid passages function as described herein for other fluid passage embodiments.

Vapor, a gaseous phase of the working fluid, is primarily formed near the evaporator section, but vapor is present, to some degree, throughout the fluid passages. Condensate, a liquid phase of the working fluid, is condensed from the vapor near the condenser section, but condensate is optimally present, to some degree, throughout the fluid passages.

FIG. 4A illustrates a cross-sectional side view of one embodiment of a disc drive system 20″ of the present invention. In this embodiment, base housing 24 and fluid passages are fabricated as described above. Heat transport structure 52 is fabricated by disposing pipes 450 within base housing 24. Pipes 450 are mechanically expanded into thermal contact with base housing 24. Alternately, pipes 450 are expanded into thermal contact with base housing 24 by thermal expansion techniques. For example, pipes 450 are contracted by cooling, and/or base housing 24 is expanded by heating prior to disposing pipes 450 within base housing. As pipes 450 warm and expand, and/or base housing 24 cools to ambient temperature and contracts, tighter contact between pipes 450 and base housing 24 is obtained. An internal fluid passage 460 is located within pipes 450.

One method of manufacture of this embodiment is to insert pipes into fluid passages 470 formed in base housing. Inserted pipes are of approximately the same diameter as base housing fluid passages 470. A junction exists between the pipe 450 and the base housing fluid passage 470. This junction introduces thermal contact resistance, that is, conductivity at the junction is reduced making heat transfer (between base housing and heat transport structure) less efficient. Accordingly, some embodiments of the present invention are able to mitigate the thermal contact resistance of a contact junction. For example, mechanical or thermal means are used to expand pipes 450 into secure contact with base housing 24. Alternatively, a thermal compound is used between pipe 450 and base housing 24 to facilitate heat flow therebetween.

In another embodiment of the present invention, pipes 450 are embedded within the mass of base housing to form a heat transport structure. For example, pipes forming the heat transport structure are placed into material comprising the base housing during the casting or molding of the base housing. Alternatively, the base housing is cast or molded around pipes 450 comprising the heat transport structure. Pipes 450 are in a heat exchange relationship with the base housing, and are sized to provide necessary working fluid flow to achieve the desired heat transport within the base housing. Various embodiments of the present invention arrange pipes 450 in any number of configurations within the base housing to achieve the required total heat transfer, the heat transfer occurring at desired locations within the base housing. Once pipes 450 are in place within the base housing, a working fluid is introduced within pipes 450, and internal fluid passage 460 is evacuated and sealed as previously described for other fluid passage configurations.

In another example embodiment of the present invention, a complete heat pipe formed by conventional means is inserted within fluid passages 470 and a seal is added. The independent heat pipe is fabricated as a completed unit separate from the base housing (e.g., formed, filled with a working fluid, evacuated and sealed). In this embodiment, the (base housing) seal is not needed to maintain an evacuated internal fluid passage 460 since the evacuated location is within the separately-sealed heat pipe. Such separate heat pipes are mechanically fastened within the base housing, as by welding, soldering, epoxy or by way of fastening to or incorporation into the base housing. Alternatively, the base housing is formed around a heat transport structure that is comprised of completed heat pipes. By any means of fabrication, the heat transport structure, comprised of heat pipes, is integral to the base housing. To improve the thermal interface between a heat pipe's evaporator and condenser regions, and the base housing, a suitable heat-conducting filler is added to fill any void space. As will readily be appreciated by those skilled in this particular art, the arrangement of components within the base housing, the construction, materials and particular shape of the heat transport structure, and the configuration of the various fluid flow paths within the interior of the base housing are merely representative of the wide variety of component arrangements, fluid passage configurations and heat transport structure shape and construction that are alternatively utilized without departing from principles of the present invention.

Figure 5A:
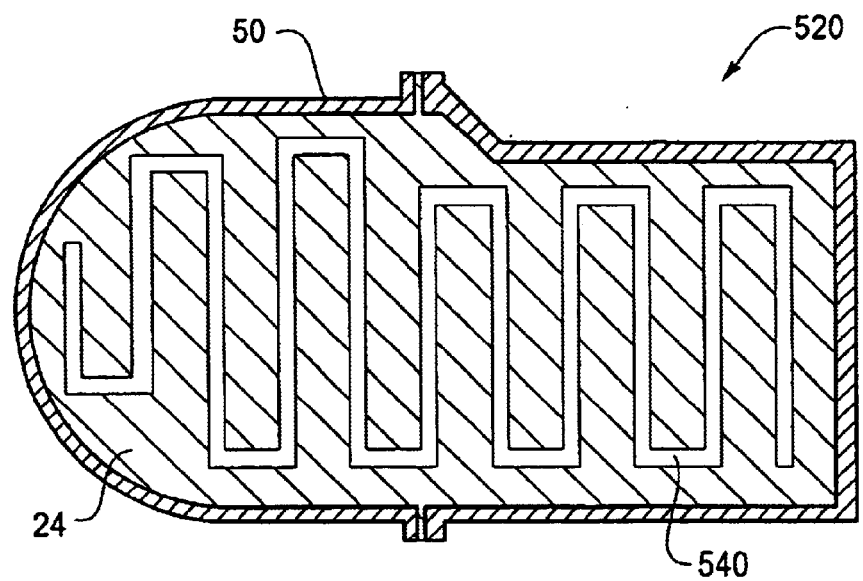
FIG. 5A is a cut-away top view of one example embodiment of a disc drive system having a serpentine-shaped channel heat transport structure in accordance with the present invention.

FIG. 5A illustrates an alternative embodiment of the invention. A disc drive system 520 is provided. Disc drive system 520 includes a heat transport structure, integral to base housing 24, in the form of a serpentine channel 540. The serpentine shape of channel 540 provides a path by which the working fluid is disbursed to various locations in base housing 24. Serpentine channel 540 is first fabricated open on one side of base housing 24. Serpentine channel 540 is formed by molding or casting the shape into base housing 24, or is formed by machining the channel 540 into a previously molded or cast base housing 24. A working fluid is contained within serpentine channel 540. Preferential location of serpentine channel 540 is used with this embodiment of the invention. Serpentine channel 540 is optionally oriented to permit gravity assisted flow of condensed working fluid back to a selected location along serpentine channel 540. Serpentine channel 540 and base housing 24 are fabricated with any or all of the features or materials of base housings and fluid passages of other embodiments of the present invention described herein. Thus, for example, a wicking structure is provided within one example embodiment of serpentine channel 540.

Serpentine channel 540 is sealed in a fashion using similar materials and methods, as are set forth for embodiments described above. Alternatively, a seal is configured as a plate having a flat shape which covers serpentine channel 540. The seal is braised, welded, or glued to base housing 24 to seal and complete enclosure of serpentine channel 540. Naturally, it is possible to configure heat transport structures within base housing 24 as an arrangement of more than one serpentine channel 540. Embodiments of the present invention having a different serpentine shape, or having the serpentine channel arranged in a circular or other irregular shape, or in a combination of such channels, are within the spirit of the present invention. A single seal or a plurality of seals are used to seal multiple channels or cavities.

Figure 5B:
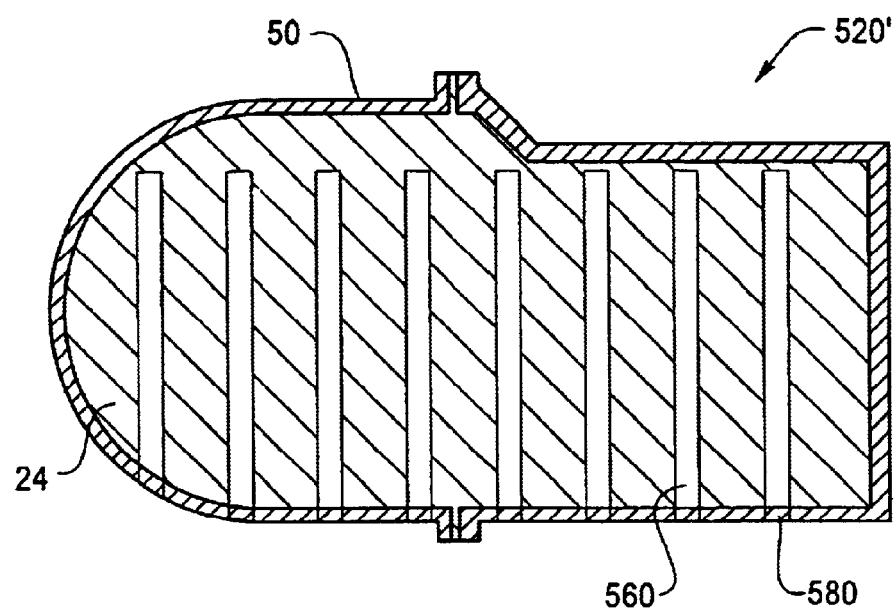
FIG. 5B is a cut-away top view of one example embodiment of a disc drive system having a heat transport structure comprising substantially parallel fluid passages in accordance with the present invention.

FIG. 5B illustrates a further embodiment of a disc drive system 520' of the present invention. The heat transport structure is configured as a plurality of non-matrixed fluid passages, or channels 560. Channels 560 are optionally oriented in any convenient direction. In one example embodiment, channels 560 are substantially parallel to one another (as shown). In an alternative embodiment, each channel is formed in a serpentine shape. In a further embodiment, channels 560 are oriented in differing directions at differing depths within base housing 24.

Figure 6:
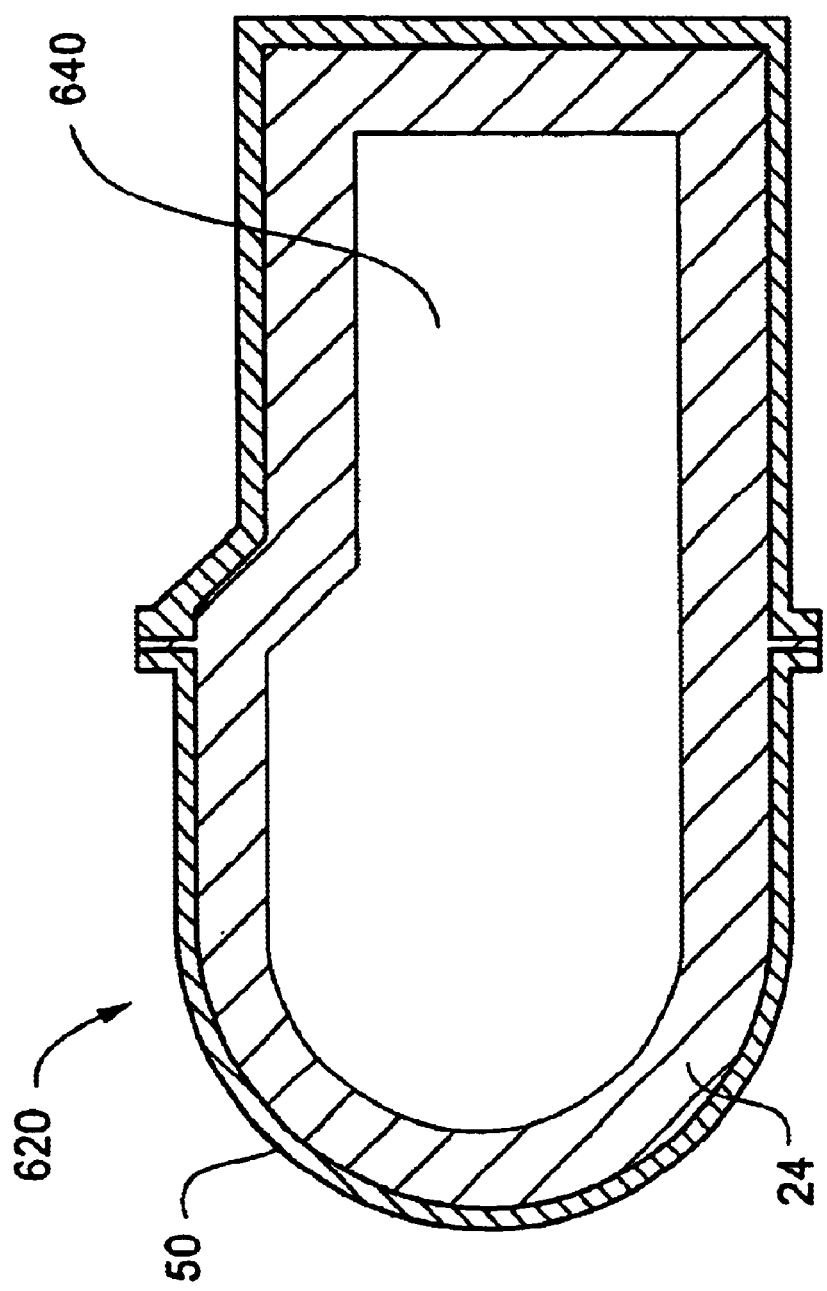
FIG. 6 is a cut-away top view of one example embodiment of a disc drive system having a heat transport structure formed as an irregular-shape cavity in accordance with the present invention.
Figure 7:
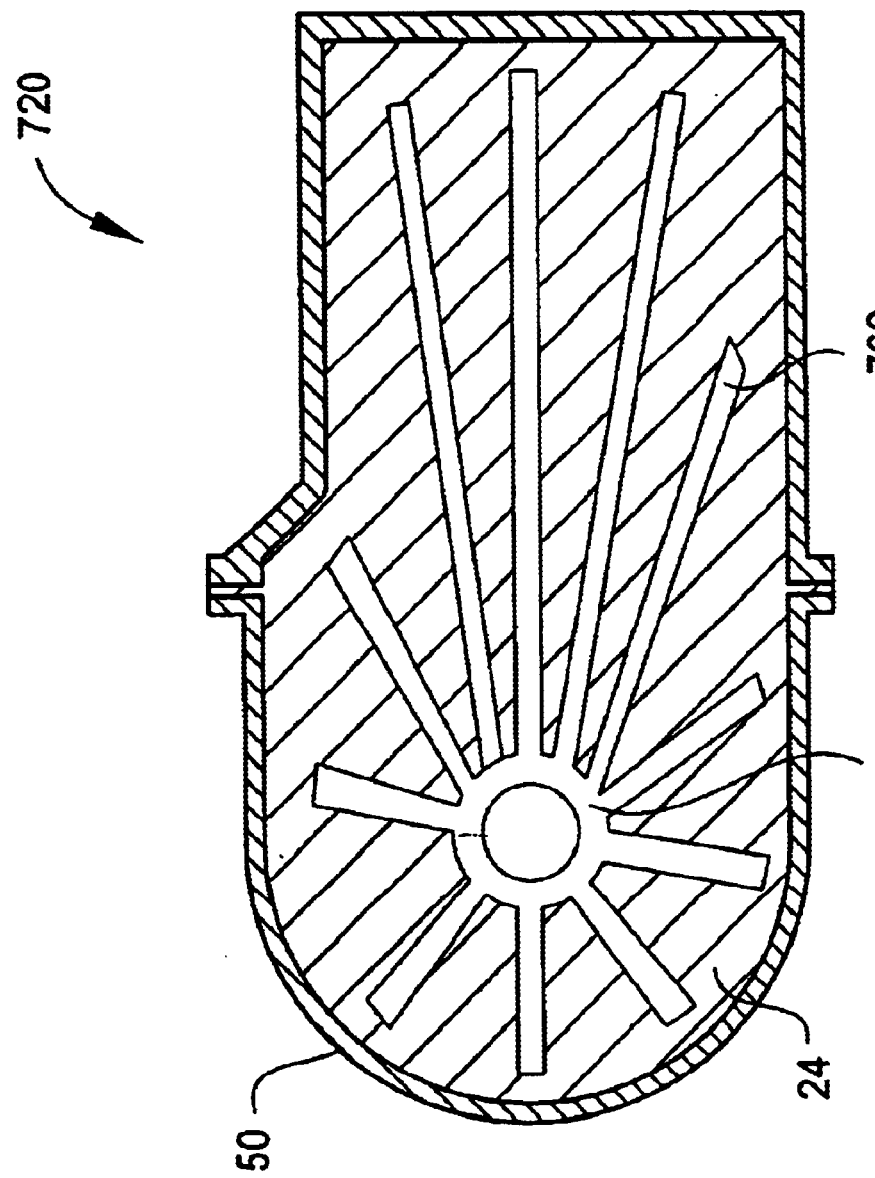
FIG. 7 is a cut-away top view of one example embodiment of a disc drive system having a heat transport structure comprising radially-oriented fluid passages emanating from a heat-generation region in accordance with the present invention.

FIG. 6 illustrates another embodiment of a disc drive system 620 having a heat transport structure formed as an irregular shaped cavity 640. FIG. 7 illustrates a disc drive system 720 having a heat transport structure with a radial configuration of fluid passages 760, or channels, emanating from a circular fluid passage header 740. Header 740 is preferably located near a heat-generating component and functions as an evaporator section for the arrangement of radially-oriented fluid passages 760.

Referring once again to FIG. 4A, a rotating disc storage device 22 having at least one heat-generating component is mounted on, attached to, disposed within, or in thermal proximity to, base housing 24. Conventional means are used to place the heat-generating components in thermal communication with base housing 24. Absorbed heat is heat which is produced by the heat-generating component(s). Heat is absorbed by a working fluid in an evaporator section of the heat transport structure. Dissipated heat is heat liberated from the working fluid vapor in a condenser section of the heat transport structure when vapor undergoes a phase change to become condensate (liquid).

Heat from rotating disc storage device components is absorbed by, and flows through, the base housing into the evaporator section of the heat transport structure. In the evaporator section, absorbed heat causes liquid working fluid to increase in temperature. At least a portion of the liquid working fluid changes phase to become vapor upon absorbing heat. Furthermore, the absorbed heat also causes the vapor temperature to increase. The vapor travels through the adiabatic section of the heat transport structure to arrive at a condenser section where the vapor undergoes a phase change to condensate, thereby liberating the absorbed heat.

The liberated heat is dissipated from the condenser section and is absorbed by a relatively cooler portion of base housing 24. Base housing 24 further conducts the heat to a heat sink device or radiates the heat into the ambient air. Condensate collects by gravity into a wicking structure and is drawn along the wicking structure to return to the evaporator section. The process proceeds as continuous cooling cycle.

Any embodiments described above, and in each of the other embodiments described herein, the heat transport structure and the working fluid transfer heat from a relatively hot location of the base housing to a relatively cooler location of the base housing. A "hot location," as referred to herein, is a location whose temperature has been elevated by heat produced by a heat-generating disc drive component. A "cold location" or "relatively cooler location" as referred to herein, is a location whose temperature is closer to ambient temperature than a hot location. Although relatively cooler than a hot location, a cold location is typically at a higher temperature than ambient temperature, ambient temperature being, for example, room temperature. The evaporator region or section of a heat transport structure is that portion of the heat transport structure positioned near to base housing hot locations. The condenser region or section of a heat transport structure is that portion of the heat transport structure positioned close to relatively cooler locations of base housing. Portions of the heat transport structure between evaporator and condenser sections serve as adiabatic sections.

The working fluid receives heat in an evaporator section of the heat transport structure near hot base housing locations and vaporizes. The vapor working fluid then moves through an adiabatic section to a condenser section of the heat transport structure near a relatively cold base housing location. At the condenser section, the working fluid gives up its heat and condenses to a liquid phase. Condensed working fluid moves back to the evaporator section of heat transport structure, and the cooling cycle repeats. The movement of working fluid, especially movement from condenser sections to evaporator sections, is facilitated by a wicking structure and/or gravity. Heat is continually added to hot locations of the base housing by disc drive system heat-generating components and is fluidly transported to the relatively cooler locations of the base housing.

A heat transport process within a fluid passage matrix provides a cooling means to prevent overheating of the disc drive components. At evaporator regions of a fluid passage matrix, near hot base housing locations, heat is absorbed into the working fluid. A portion of the working fluid changes into vapor, and the vapor dissipates throughout the fluid passage matrix. At condenser regions of the fluid passage matrix, near relatively cooler base housing locations, the working fluid vapor condenses. Capillary action, gravity, or both causes the condensed working fluid to flow from condenser regions to evaporator regions of the fluid passage matrix. The heat transporting cycle is repeated continuously.

Accordingly, the present invention is not to be necessarily limited to the particular examples described above, but is intended to cover all aspects of the invention as fairly set out in the attached claims. For instance, while disc drive systems are illustrated, other heat-generating media storage and electronic devices can benefit from the above-mentioned teachings. Various modifications, equivalent processes, as well as numerous structures to which the present invention may be applicable will be readily apparent to those of skill in the art to which the present invention is directed upon review of the present specification. The claims are intended to cover such modifications, devices and methods.

We claim:

1. A disc drive system, comprising:
   a rotating disc storage device having at least one heat-generating component; and
   a base housing having a sealed internal heat transport structure including at least one matrix of interconnected tubes containing a working fluid, wherein the matrix of tubes is a sealed matrix of heat pipes, and the rotating disc storage device is disposed on the base housing with the at least one heat-generating component being in a heat exchange relationship with the base housing.

2. The disc drive system of claim 1, wherein the rotating disc storage device includes a plurality of discs fitted onto a spindle having a bearing, the spindle rotatably coupled to a motor, the discs being of a media type selected from the group consisting of magnetic media and optical media.

3. The disc drive system of claim 1, further comprising a wick located within the heat transport structure wherein the wick facilitates capillary movement of a liquid form of the working fluid.

4. The disc drive system of claim 3, wherein the wick is a type selected from the group consisting of fiber bundles, mesh, sintered cavity surface, grooved cavity surface, and roughened cavity surface.

5. The disc drive system of claim 1, wherein each tube is mechanically expanded into thermal contact with the fluid passage containing the tube prior to each tube being sealed to contain the working fluid.

6. The disc drive system of claim 1, wherein the base housing is formed from a material selected from the group consisting of metallic and thermally-conductive ceramic.

7. The disc drive system of claim 6, wherein the metallic material is selected from the group consisting of aluminum, copper, and magnesium.

8. The disc drive system of claim 1, wherein a first portion of the heat transport structure is adapted to receive heat from a hot location of the base housing, transfer heat to the working fluid vaporizing at least a portion of the working fluid, fluidly transport the vaporized working fluid from the first portion to a second portion of the heat transport structure, and release the heat from the working fluid at the second portion of the heat transport structure to a relatively cooler location of the base housing.

9. The disc drive system of claim 8, wherein the heat transport structure is adapted for gravity to assist flow of the working fluid from the second portion to the first portion of the heat transport structure.

10. The disc drive system of claim 9, wherein the heat transport structure is adapted to maintain a portion of the working fluid as a liquid having a temperature near its boiling point during normal disc drive operation.

11. The disc drive system of claim 10, wherein the working fluid has a boiling point less than or equal to 80° C., and the working fluid has a boiling point greater than or equal to 56° C., at standard atmospheric pressure.

12. The disc drive system of claim 1, wherein an internal pressure within the heat transport structure at an ambient temperature is relatively lower than ambient pressure outside the heat transport structure.

13. The disc drive system of claim 12, wherein the working fluid is water and the internal pressure within the heat transport structure is reduced to a pressure at which the working fluid has a boiling point less than 100° C.

14. The disc drive system of claim 13, wherein the internal pressure within the heat transport structure is reduced to a pressure at which the working fluid has a boiling point less than or equal to 60° C., and the working fluid has a boiling point greater than or equal to 40° C.

15. The disc drive system of claim 1, wherein the working fluid is a water-based mixture.

16. The disc drive system of claim 1, wherein the working fluid is a fluorocarbon liquid.

17. A disc drive system, comprising:
   a rotating disc storage device having at least one heat-generating component; and
   a base housing having a sealed internal heat transport structure including at least one hub tube and a plurality of tubes connected to and radiating from the hub tube, wherein the tubes contain a working fluid and are sealed heat pipes, and the rotating disc storage device is disposed on the base housing with the at least one heat-generating component being in a heat exchange relationship with the base housing.

* * * * *